United States Patent
Iwaya et al.

(10) Patent No.: US 12,459,653 B2
(45) Date of Patent: Nov. 4, 2025

(54) APPARATUS AND SYSTEM FOR REGULATING CABIN PRESSURE OF FLIGHT CRAFT, AND FLIGHT CRAFT EQUIPPED TO REGULATE CABIN PRESSURE

(71) Applicant: Iwaya Inc., Ebetsu (JP)

(72) Inventors: Keisuke Iwaya, Ebetsu (JP); Kazuya Sajiki, Ebetsu (JP)

(73) Assignee: Iwaya Inc. (JP)

( * ) Notice: Subject to any disclaimer, the term of this patent is extended or adjusted under 35 U.S.C. 154(b) by 0 days.

(21) Appl. No.: 18/760,162

(22) Filed: Jul. 1, 2024

(65) Prior Publication Data
US 2025/0002159 A1    Jan. 2, 2025

(30) Foreign Application Priority Data
Jun. 30, 2023    (JP) ................. 2023-108616

(51) Int. Cl.
*B64D 3/02*    (2006.01)
*B64D 13/02*    (2006.01)

(52) U.S. Cl.
CPC .................... *B64D 13/02* (2013.01)

(58) Field of Classification Search
None
See application file for complete search history.

(56) References Cited

U.S. PATENT DOCUMENTS

| 4,506,594 | A | * | 3/1985 | Rowland ............... B64D 13/04 137/489 |
| 4,779,644 | A | * | 10/1988 | Benson ................. B64D 13/00 60/39.15 |

(Continued)

FOREIGN PATENT DOCUMENTS

| CN | 101606011 A | 12/2009 |
| DE | 2710981 A1 | 9/1978 |

(Continued)

OTHER PUBLICATIONS

Office Action issued in the corresponding Japanese Patent Application No. 2023-108616; mailed on Oct. 3, 2023 (total 6 pages).

(Continued)

*Primary Examiner* — Ko-Wei Lin
(74) *Attorney, Agent, or Firm* — Harness, Dickey & Pierce, P.L.C.

(57) ABSTRACT

An apparatus is provided for regulating air pressure in an internal space of an airtight cabin that accommodates living beings (objects) for transport in a flight craft, comprising: a container; and a moveable partition member that airtightly partitions an internal space of the container into a first space open to the internal space of the airtight cabin and a second space closed to both the internal space of the airtight cabin and an external space of the airtight cabin, and that moves in the container under a force generated by a difference between a pressure of gas in the first space and a pressure of gas in the second space while maintaining the airtight partition between the first space and the second space; wherein as the moveable partition member moves it opens and closes a gas transfer path for flow of gas between the internal space of the airtight cabin and the external space of the airtight cabin.

6 Claims, 9 Drawing Sheets

(56) References Cited

U.S. PATENT DOCUMENTS

| | | | | |
|---|---|---|---|---|
| 4,887,630 | A * | 12/1989 | Hill | A62C 2/242 |
| | | | | 137/75 |
| 6,386,835 | B1 * | 5/2002 | Kalpakoff | F04B 53/16 |
| | | | | 417/423.12 |
| 2005/0153648 | A1 * | 7/2005 | Horner | G05D 16/202 |
| | | | | 454/74 |
| 2006/0234621 | A1 * | 10/2006 | Desrochers | F24F 3/044 |
| | | | | 702/50 |
| 2010/0317276 | A1 | 12/2010 | Bracker et al. | |
| 2011/0259546 | A1 * | 10/2011 | DeFrancesco | B64D 13/00 |
| | | | | 137/861 |
| 2013/0118191 | A1 | 5/2013 | Zywiak et al. | |
| 2013/0320143 | A1 * | 12/2013 | Chaumel | B64C 1/1484 |
| | | | | 156/109 |
| 2014/0366965 | A1 * | 12/2014 | Simpson | F16K 31/1225 |
| | | | | 137/500 |
| 2015/0321744 | A1 | 11/2015 | Vetter et al. | |
| 2018/0346128 | A1 * | 12/2018 | Kozlowski | F16K 31/0613 |
| 2019/0118926 | A1 * | 4/2019 | Tiryaki | B64C 1/10 |
| 2022/0147074 | A1 * | 5/2022 | Ernst | B64D 13/04 |
| 2023/0303253 | A1 * | 9/2023 | Mugurusa | B64G 1/48 |

FOREIGN PATENT DOCUMENTS

| | | |
|---|---|---|
| JP | 2013-103715 A | 5/2013 |
| JP | 2013-543812 A | 12/2013 |
| JP | 7071771 B2 | 3/2022 |
| JP | 7201284 B1 | 1/2023 |

OTHER PUBLICATIONS

Office Action issued in the corresponding Chinese Patent Application No. 202410734934.1; Issued on Jan. 4, 2025 (total 20 pages).

* cited by examiner

FIG. 12

APPARATUS AND SYSTEM FOR REGULATING CABIN PRESSURE OF FLIGHT CRAFT, AND FLIGHT CRAFT EQUIPPED TO REGULATE CABIN PRESSURE

CROSS REFERENCE TO RELATED APPLICATIONS

This application claims priority to Japanese Patent Application No. 2023-108616 filed Jun. 30, 2023, the entirety of which is expressly incorporated by reference herein.

TECHNICAL FIELD

This invention relates to a technique for regulating pressure in a cabin that houses objects for transportation in a flight craft.

BACKGROUND ART

When an aircraft or other flight craft transports living beings including humans or other animals, air in an interior space of a container (hereinafter referred to as a "cabin") that houses the beings to be transported must be pressurized to within prescribed range and contain sufficient oxygen to sustain life of the living beings housed in the cabin.

Various mechanisms (air conditioning systems) have been proposed to regulate air in an enclosed space such as a cabin to sustain life of living beings transported in the cabin. For example, JP2013-103715A discloses an air conditioning system for an aircraft. The air conditioning system disclosed in JP2013-103715A compresses outside air, by use of a compressor, to a pressure within a predetermined range, and supplies the compressed air to the aircraft cabin for circulation.

When a flight craft reaches a high altitude, for example, an altitude that is more than 10,000 meters above sea level, air around the flight craft decreases to a pressure and temperature that is too low to sustain life in living beings such as humans or other animals. To obviate this risk, a cabin of a flight craft used to accommodate humans or other animals for transport by the flight craft must be maintained airtight.

An airtight cabin used for transportation of humans or animals must be supplied with air for breathing via cylinders or other sources. Supply of air to the airtight cabin causes a pressure of air in the cabin to increase.

If an air pressure in the cabin deviates significantly from atmospheric pressure, humans or animals in the cabin will suffer from headaches and other physical problems due to disruption of their autonomic nervous systems. Accordingly, it is important to maintain an air pressure in a cabin within a range close to normal atmospheric pressure (hereinafter referred to as an "optimum range").

A pressure gauge may be provided in the cabin for monitoring by crew in the cabin. If the pressure is shown to deviate from the optimum range, the crew can manually open and close an exhaust port in the cabin to exhaust air to the outside atmosphere and thereby maintain air pressure in the cabin within the optimum range.

However, the above method requires time and effort on behalf of the crew, and may be subject to accident due to human error.

The present invention has been made in view of the above circumstances, and has as its objective the provision of a means to regulate air pressure in an airtight cabin within an optimum range.

SUMMARY

The present invention provides an apparatus for regulating an air pressure in an internal space of an airtight cabin used to accommodate living beings to be transported in a flight craft, the apparatus comprising: a container; and a moveable partition member that airtightly partitions an internal space of the container into a first space that is open to the internal space of the airtight cabin and a second space that is closed to both the internal space of the airtight cabin and an external space of the airtight cabin, and moves in the container under a force generated by a difference between a pressure of gas in the first space and a pressure of gas in the second space while maintaining the airtight partition between the first space and the second space; wherein, the movable partition member opens and closes a gas transfer path for flow of gas between the internal space of the airtight cabin and the space exterior to the airtight cabin.

Effects of the Invention

According to the present invention, air pressure in the cabin is maintained within an optimum range.

DETAILED DESCRIPTION

[1] Embodiment

Figure 1:
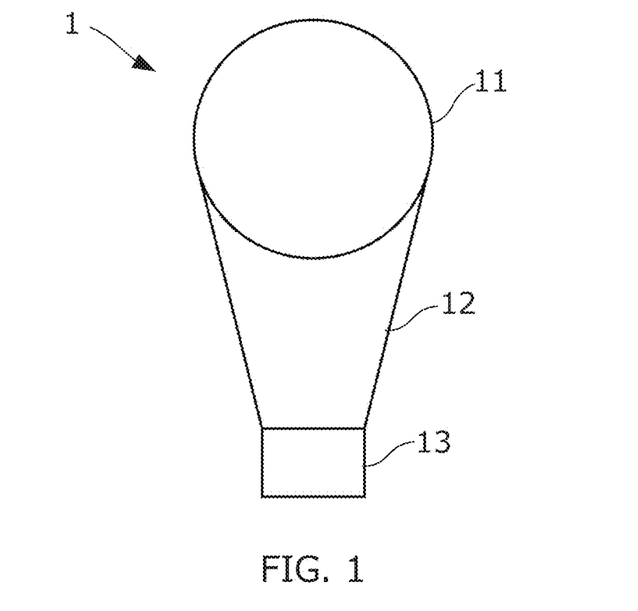
FIG. 1 shows an appearance of a flight craft according to an exemplary embodiment of the present invention.

Following is a description of flight craft 1 according to an exemplary embodiment of the present invention. FIG. 1 shows the appearance of flight craft 1. As viewed from its exterior, flight craft 1 includes envelope 11, suspension cables 12, and cabin 13.

Envelope 11 contains a lighter-than-air gas such as helium that imparts buoyancy to raise flight craft 1. Suspension cables 12 interconnect envelope 11 and cabin 13. Cabin 13 is an airtight container comprising an internal space that accommodates living beings (objects) to be transported. Objects to be transported may include, for example, crew (humans) or animals.

Figure 2:
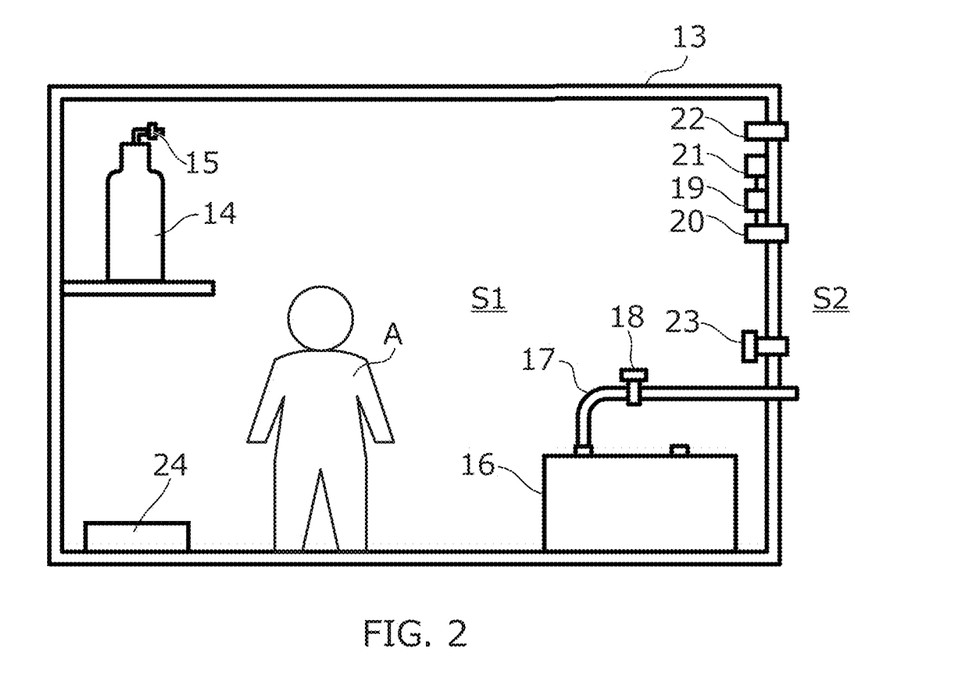
FIG. 2 shows components housed in the internal space of a cabin according to the exemplary embodiment of the present invention.

FIG. 2 shows components of flight craft 1 that are housed in internal space S1 of cabin 13, including those that penetrate the wall of cabin 13 and are partially exposed to external space S2. Components housed in the internal space S1, including those that penetrate the wall of cabin 13, are gas cylinder 14, constant flow valve 15, regulator 16, exhaust pipe 17, manual open/close valve 18, pressure gauge 19, solenoid valve 20, alarm device 21, differential pressure control valve 22, manual open/close valve 23, and carbon dioxide absorber 24. As shown in FIG. 2, internal space S1 also accommodates crew A, an example of objects to be transported.

Gas cylinder 14 is a pressure-resistant container that is capable of holding a gas at a higher pressure than atmospheric pressure, for example, at 5 to 8 atmospheres before constant flow valve 15 is opened. The gas contained in gas cylinder 14 is normal air or air containing a greater proportion of oxygen than that contained in normal air. Namely, the gas contained in gas cylinder 14 is, for example, normal air, highly oxygenated air containing oxygen in a greater proportion than that present in normal air, or pure oxygen.

Constant flow valve 15 is a valve mounted to the gas supply path that leads from gas cylinder 14 to internal space S1. Constant flow valve 15 opens when the pressure difference between the inside and outside of gas cylinder 14 is above a predetermined threshold, thereby maintaining a substantially constant flow of oxygen from gas cylinder 14 to internal space S1. In this context, the wording "substantially constant flow rate" describes a state such that the flow rate is not always the same but varies within a predetermined range. The type of constant flow valve 15 is not limited to any one type, and may be of any suitable type including a rubber orifice type, a needle orifice type, etc.

Regulator 16 closes the gas flow path between internal space S1 and external space S2 of cabin 13 when the absolute pressure of gas in internal space S1 is less than (or below) a threshold PT3 so as to maintain internal space S1 airtight from external space S2. Regulator 16 opens the gas flow path between internal space S1 and external space S2 when the absolute pressure of internal space S1 is equal to (or exceeds) the threshold PT3 to allow gas to move from internal space S1 to external space S2. The configuration of regulator 16 will be described later.

Exhaust pipe 17 is a pipe that forms a gas flow path from internal space S1 through regulator 16 to external space S2. One end of exhaust pipe 17 (inner end) is connected to regulator 16, and the other end (outer end) is exposed to external space S2 via the wall of cabin 13.

Manual open/close valve 18 is a valve that is used to manually open or close the gas flow path formed by exhaust pipe 17, by, for example, operation by crew A. Manual open/close valve 18 is used to stop outflow of gas from internal space S1 to external space S2 if a failure occurs in regulator 16 and the absolute pressure of the gas in internal space S1 becomes less than (or equal to) the threshold PT3. Under normal operation, regulator 16 stops outflow of gas from internal space S1 via exhaust pipe 17 to external space S2. However, if crew A is alerted by alarm device 21 (described later) to an abnormal pressure drop, he/she responds by closing manual open/close valve 18.

Pressure gauge 19 measures an absolute pressure of the gas in internal space S1, or a pressure of the gas in internal space S1 relative to atmospheric pressure. Solenoid valve 20 is arranged to penetrate the wall of cabin 13 (or to seal the tube that penetrates the wall of cabin 13). Solenoid valve 20 opens when the pressure continuously measured by pressure gauge 19 rises and reaches the upper threshold PT5, and closes when the pressure continuously measured by pressure gauge 19 falls and reaches the lower threshold PT4.

Solenoid valve 20 is designed such that even if a failure occurs in regulator 16 and the absolute pressure of the gas in internal space S1 is equal to (or exceeds) the threshold PT3, and there is no outflow of gas from internal space S1 through regulator 16 and the exhaust pipe 17, and internal space S1 is maintained airtight relative to external space S2, and the pressure of the gas in internal space S1 continues to rise and reaches the threshold value PT5, solenoid valve 20 opens to allow gas to flow from internal space S1 to external space S2 thereby causing a pressure of the gas in internal space S1 to decrease to the threshold PT4.

Alarm device 21 alerts crew A in cabin 13 to an abnormal increase in gas pressure in internal space S1 by sounding a warning tone or turning on a warning light when the pressure continuously measured by pressure gauge 19 rises and reaches the upper threshold value PT7. Thereafter, when the pressure continuously measured by pressure gauge 19 falls and reaches the lower threshold PT6, alarming device 21 discontinues its alert.

In addition, alarming device 21 activates to sound the warning tone or turn on the warning light when the pressure continuously measured by pressure gauge 19 drops and reaches the lower threshold PT1 and alerts crew A in cabin 13 of an abnormal drop in gas pressure in internal space S1. Thereafter, when the pressure continuously measured by pressure gauge 19 rises and reaches the upper threshold PT2, alarm device 21 discontinues its alert.

In this embodiment, the quantitative relationship between the threshold values PT1 to PT7 described above and atmospheric pressure AP is $PT1<PT2<AP<PT3<PT4<PT5<PT6<PT7$.

Differential pressure control valve 22 is arranged to penetrate the wall of cabin 13. Differential pressure control valve 22 closes when a pressure difference between the gases in internal space S1 and external space S2 is less than (or equal to) the predetermined threshold QT so as to maintain internal space S1 airtight relative to external space S2. Differential pressure control valve 22 opens when a pressure difference between the gasses in internal space S1 and external space S2 is equal to the threshold QT (or exceeds the threshold QT) to allow gas to move from internal space S1 to external space S2.

The threshold QT, which is the pressure at which differential pressure control valve 22 opens and closes, is the difference between the pressure of the gas in external space S2 at an assumed maximum flight altitude of flight craft 1 and the maximum allowable pressure of the gas in internal space S1, for example 1.5 times atmospheric pressure.

Differential pressure control valve 22 opens when the pressure of internal space S1 rises abnormally due to a failure of regulator 16 and pressure gauge 19, or a failure of regulator 16, solenoid valve 20, and alarm device 21, thereby allowing gas to flow out of internal space S1 to external space S2, and reduce the pressure of the gas in internal space S1.

Manual open/close valve 23 is arranged to penetrate the wall of cabin 13, or to seal the tube that penetrates the wall of cabin 13. Manual open/close Valve 23 is operated to opens or close the gas flow path between internal space S1 and external space S2 by, for example, a manual operation of crew A. For example, if crew A is alerted by alarm device 21 to an abnormal increase in pressure, he/she responds by opening manual open/close valve 18.

Carbon dioxide absorber 24 is a liquid or solid substance that absorbs carbon dioxide from a gas that it comes into contact with by way of a chemical reaction at room temperature with carbon dioxide in the gas. Examples of carbon dioxide absorber 24 include, but are not limited to, calcium hydroxide and sodium dioxide. Carbon dioxide absorber 24 is housed in a vented container that allows ambient gases to enter and exit while preventing accidental contact with the liquid or solid substance by crew A or others. Carbon dioxide absorber 24 may be housed in a container such as a bag, or the container vents may be sealed with a sheet or the like to prevent contact with outside air prior to flight of flight craft 1, i.e., when not in use. Carbon dioxide absorber 24 begins absorbing carbon dioxide when the housing is opened or the sheet sealing the container vents is removed immediately prior to or after commencement of flight of flight craft 1.

Carbon dioxide absorber 24 absorbs excess carbon dioxide created by breathing of crew A etc. in internal space S1, which is maintained airtight from external space S2, thereby maintaining a carbon dioxide concentration in the gas of internal space S1 close to that of normal air.

The configuration of Regulator 16 will now be described below.

Figure 3:
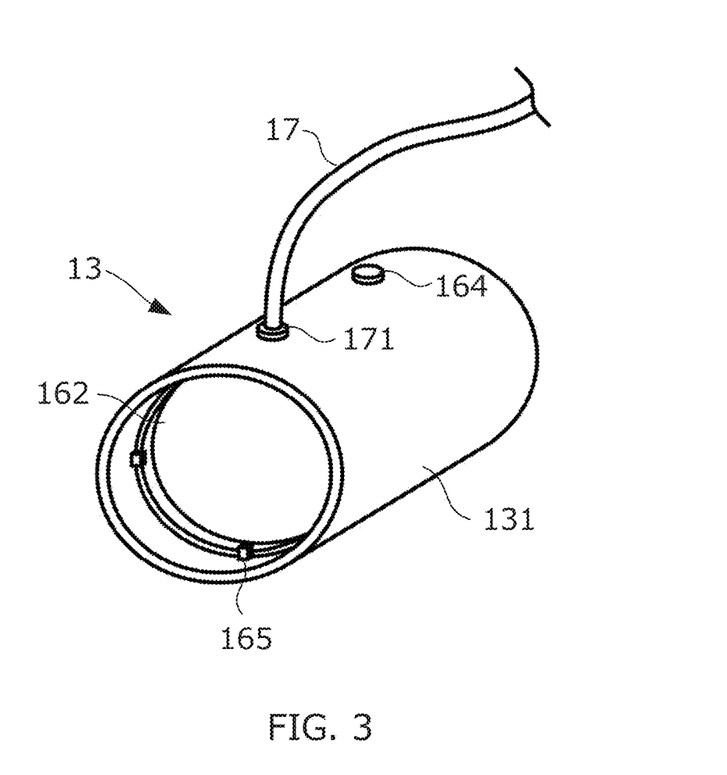
FIG. 3 shows an appearance of an apparatus for regulating cabin pressure according to the exemplary embodiment of the present invention.
Figure 4A:
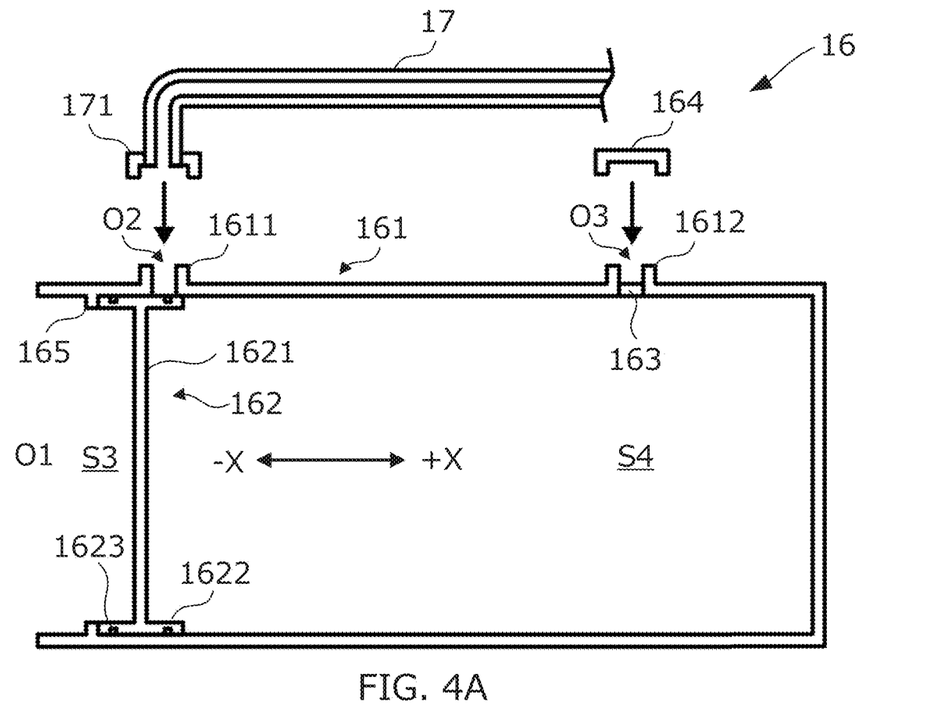
FIGS. 4A and 4B show a configuration of the apparatus for regulating cabin pressure.
Figure 4B:
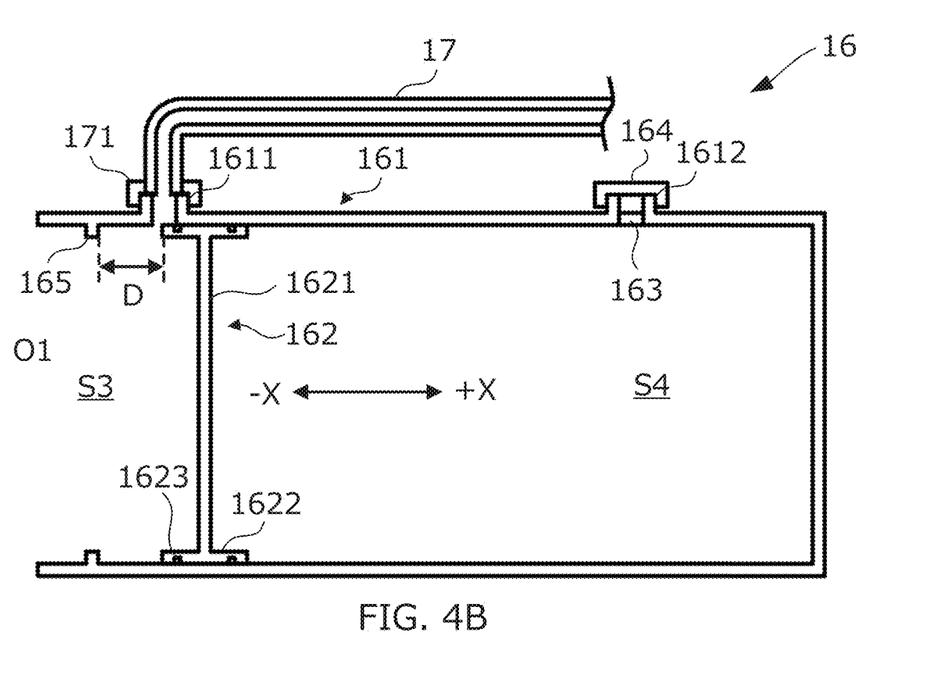

FIG. 3 is illustrative of the appearance of regulator 16, while FIGS. 4A and 4B are illustrative of the configuration of regulator 16. Regulator 16 includes container 161, partition member 162, relief Valve 163, cap 164, and stopper 165.

Container 161 is shaped as a cylindrical container as a whole and has openings O1, O2, and O3.

The internal space of container 161 is separated by partition member 162 into open space S3 (an example of a first space), namely, as depicted on the left side of FIGS. 4A and 4B, and closed space S4 (an example of a second space), as depicted on the right side of FIGS. 4A and 4B.

Opening O1 is an opening at open space S3 side that allows movement of gas between internal space S1 in cabin 13 and open space S3 in container 161.

Opening O2 allows movement of gas between open space S3 in container 161 and external space S2 of cabin 13 via exhaust pipe 17. Container 161 is provided with plug 1611, which is formed to surround and project outward from opening O2. Plug 1611 is airtightly connected to socket 171 at the inside end of exhaust pipe 17.

Opening O2 may be blocked by moveable partition member 162, as shown in FIG. 4A, or left open by moveable partition member 162, as shown in FIG. 4B, depending on a position of movable partition member 162. A state in which opening O2 is blocked by partition member 162 is hereinafter referred to as a "closed state," and a state in which Opening O2 is left open by partition member 162 is hereinafter referred to as an "open state."

Opening O3 is an opening at closed space S4 side and allows free entry and exit of gas into and out of closed space S4 of container 161. Container 161 is provided with plug 1612, which is formed to surround and project outward from opening O3. Plug 1612 is connected to a socket at an end of an intake and exhaust pipe of an intake/exhaust device, not shown, during preparation of regulator 16. The gas in closed space S4 is regulated by the intake/exhaust device such that when partition member 162 is in the position shown in FIG. 4A (hereinafter referred to as the "reference position"), the pressure of the gas in closed space S4 reaches a predetermined absolute pressure, designated as Pressure PS4(0). This default pressure PS4(0) will be described later.

When pressure regulation of the gas in closed space S4 by the intake/exhaust device is completed, the socket of the intake/exhaust device is removed from plug 1612. Relief valve 163 is positioned to block opening O3 to prevent gas in closed space S4 from leaking through opening O3 when the socket is removed from plug 1612. Relief valve 163 opens when a gas pressure from inside to outside of closed space S4 or a gas pressure from outside to inside of closed space S4 reaches a threshold value sufficiently greater than pressure PS4(0) and closes when it falls below the threshold value.

Cap 164 is fitted on plug 1612 after the socket of the intake/exhaust device socket is removed from plug 1612. Cap 164 closes opening O3 to prevent gas from leaking through opening O3 from closed space S4 where regulation of gas pressure is complete. If relief valve 163 ensures prevention of gas leakage, cap 164 may not be needed.

Partition member 162 is a member that airtightly separates the internal space of container 161 into open space S3, which is open to internal space S1 of cabin 13, and closed space S4, which is closed to internal space S1 of cabin 13. Partition member 162 moves in container 161 in the X direction (left and right direction in FIGS. 4A and 4B) under the force generated by the difference between the pressure of the gas in open space S3 and the pressure of the gas in closed space S4 (inside/outside pressure difference).

The partition member 162 illustrated in FIGS. 3, 4A and 4B includes disk member 1621, cylindrical member 1622 provided to cover the entire circumference of the outer edge of disk member 1621, and one or more O-rings 1623 fitted into grooves provided on the outer surface of cylindrical member 1622. The outside diameter of cylindrical member 1622 is slightly smaller than the inside diameter of the portion of the container 161 that the cylindrical Member 1622 contacts on the inside. Therefore, O-rings 1623 can move in the X direction while in contact with the inner surface of container 161. Lubricant may be applied to the area of the inner surface of container 161 where it comes into contact with O-rings 1623. This allows for smooth sliding of partition member 162 (O-rings 1623) against container 161, while maintaining an airtight seal between open space S3 and closed space S4.

Stopper 165 is a member mounted to the inner surface of container 161 on open space S3 side, protruding inward. Stopper 165 restricts movement of partition member 162 to prevent it from moving beyond the reference position shown in FIG. 4A towards open space S3 side, namely -X direction, i.e., to the left in FIGS. 4A and 4B. In the example shown in FIGS. 3, 4A and 4B, stopper 165 consists of multiple column-shaped protrusions. However, the shape, number, and arrangement of these protrusions can be varied as long as they effectively restrict movement of partition member 162.

Normally, partition member 162 does not move significantly in the −X direction (to the left in FIGS. 4A and 4B) from the reference position. Therefore, stopper 165 is not essential. However, if an accident occurs, such as a hole forming in cabin 13, causing a temporary but significant drop in air pressure of internal space S1, there is a risk that partition member 162 could move significantly in the −X direction from the reference position. This movement could potentially act to push partition member 162 out of container 161, causing it to become dislodged. If partition member 162 becomes dislodged from container 161, opening O2 would be exposed, creating a pathway between internal space S1 of cabin 13 and external space S2 through exhaust pipe 17. This would result in leakage of gas from internal space S1 to external space S2. Stopper 165 serves to prevent such incidents by blocking unintended movement of partition member 162, thereby avoiding exposure of opening O2 and preventing leakage of gases between internal space S1 and external space S2.

The foregoing is a description of the configuration of regulator 16. The operation of regulator 16 will now be described below. In the following description, a pressure of the gas in internal space S1 is referred to as "pressure PS1" and a pressure of the gas in external space S2 is referred to as "pressure PS2."

As previously described, partition member 162 moves in the X direction due to the inside/outside pressure difference. Then, the pressure of the gas in closed space S4 with partition member 162 in the reference position is regulated to be pressure PS4(0). The pressure of the gas in closed space S4 at the position where partition member 162 has moved by a distance d in the +X direction from the reference position is hereinafter described as pressure PS4($d$).

Pressure PS4(0) is a value lower than that of atmospheric pressure, for example, 0.5 atmospheres. The value of pressure PS4(0) is set such that when partition member 162 moves a distance D from the reference position to the state shown in FIG. 4B, the pressure of the gas in closed space S4, namely pressure PS4(D), reaches a predetermined value that is higher than that of atmospheric pressure, such as 1.5 atmospheres, which is comfortable for crew A in Cabin 13. Pressure PS4(0) changes based on factors such as a capacity of container 161 and a length of cylindrical member 1622 of partition member 162 in the X-direction.

Firstly, on the ground, when crew A and others board Cabin 13 and the hatch (not shown) is closed, internal space S1 of cabin 13 becomes airtight to external space S2. In this state, partition member 162 is in the reference position as shown in FIG. 4A.

In this state, when, for example, crew A opens constant flow valve 15, a continuous supply of oxygen from gas cylinder 14 to internal space S1 begins. With the supply of oxygen, the pressure of the gas in internal space S1, namely pressure PS1, increases. Then, when pressure PS1 exceeds the pressure of the gas in closed space S4, namely pressure PS4(0), partition member 162 begins to move in the +X direction.

Subsequently, when pressure PS1 reaches pressure PS4 (D) and partition member 162 has moved a distance D in the +X direction from the reference position, a part of opening O2, which was blocked by partition member 162, is opened. As a result, internal space S1 connects with external space S2 through exhaust pipe 17. The pressure of the air in external space S2 is approximately atmospheric pressure (1 atmosphere) on the ground and decreases as flight craft 1 ascends from the ground. Namely, the pressure of the gas in external space S2 is equal to or below atmospheric pressure.

On the other hand, when regulator 16 is in the state shown in FIG. 4B, the gas pressure in internal space S1, i.e. pressure PS1, is equal to pressure PS4(D). Therefore, the gas flows from the high-pressure internal space S1 to the low-pressure external space S2.

As described above, when the gas flows from internal space S1 to external space S2, the gas pressure in internal space S1, i.e. pressure PS1, decreases, causing partition member 162 to move in the −X direction, thereby closing opening O2 and stopping the gas flow from internal space S1 to external space S2.

As described above, with the change in the gas pressure in internal space S1, i.e. pressure PS1, partition member 162 moves in the X direction to open and close opening O2, thereby maintaining the gas pressure in internal space S1, i.e. pressure PS1, equal to or below Pressure PS4(D).

[2] Modifications

The above-described regulator 16 of flight craft 1 is an exemplary embodiment of the present invention, and may be modified in various ways.

Following are examples of modifications of the above-described embodiment. Two or more of the above-described embodiment and the following modifications may be combined.

(1) The shape, number, arrangement, and other aspects of the components that comprise regulator 16, as shown in FIGS. 3, 4A and 4B, are merely examples and may be modified in various ways. For example, in the above embodiment, container 161 is assumed to be cylindrical as a whole, but it may also be square cylinder.

(2) In the above-described embodiment, regulator 16 is positioned within internal space S1. However, regulator 16 can be placed in any location providing that there is a pathway that allows gas to freely move between open space S3 and internal space S1, and another pathway that allows gas to freely move between opening O2 and external space S2.

Figure 5:
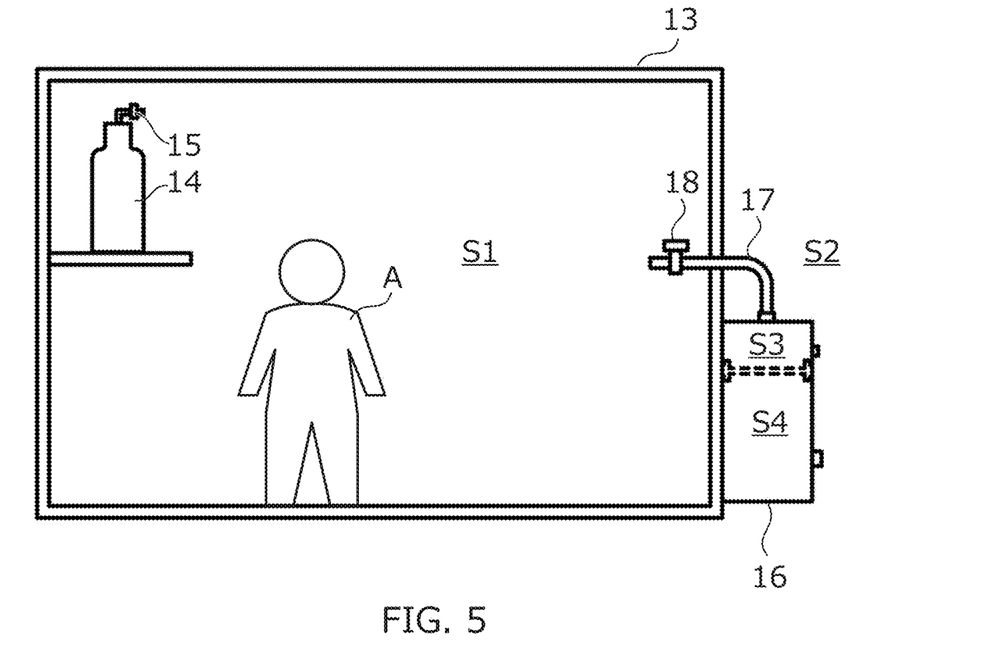
FIG. 5 shows an arrangement of the apparatus for regulating cabin pressure in the cabin according to the exemplary embodiment of the present invention.

For example, as shown in FIG. 5, regulator 16 may be placed in external space S2, the inner end of exhaust pipe 17 may be positioned in internal space S1, and the outer end of exhaust pipe 17 may be connected to opening O1 instead of opening O2. It is noted here that in FIG. 5, the illustrations of pressure gauge 19, solenoid valve 20, alarm device 21, differential pressure control valve 22, manual open/close valve 23, and carbon dioxide absorber 24 are omitted (the same is the case in FIGS. 6, 10, and 12).

Figure 6:
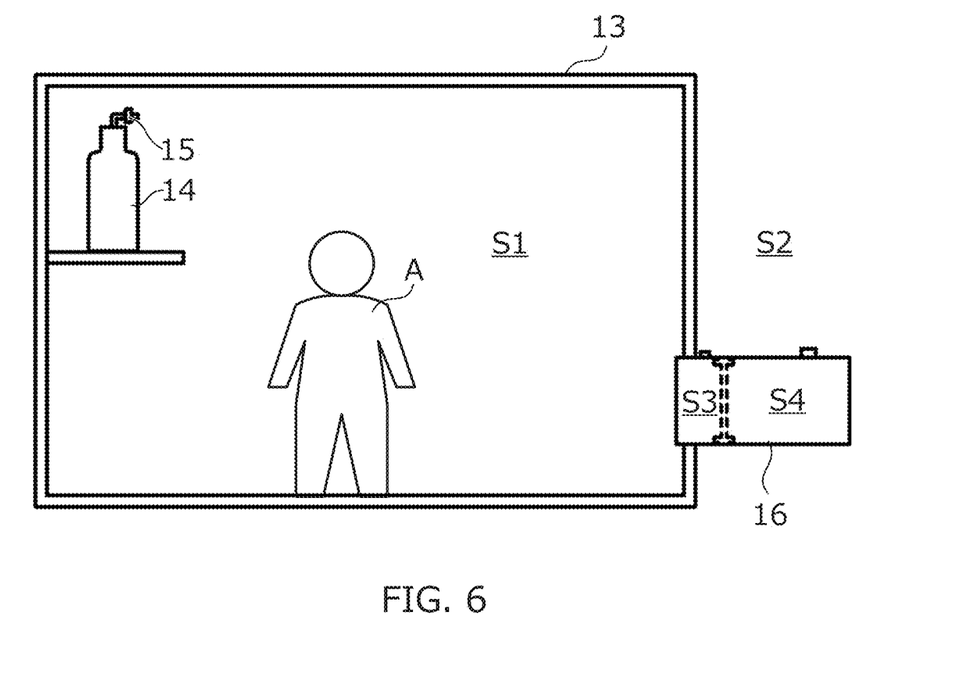
FIG. 6 shows an arrangement of the apparatus for regulating cabin pressure in the cabin according to a modified embodiment of the present invention.

As shown in FIG. 6, regulator 16 may be arranged to penetrate the wall of cabin 13, opening O1 may be located in internal space S1, and opening O2 may be located in external space S2 without use of exhaust pipe 17.

(3) Flight Craft 1 may also be equipped with multiple gas cylinders 14 and constant flow valves 15. Flight craft 1 may also be equipped with multiple regulators 16, exhaust pipes 17, and manual open/close valves 18. Flight craft 1 may also be equipped with multiple carbon dioxide absorbers 24.

Figure 7A:
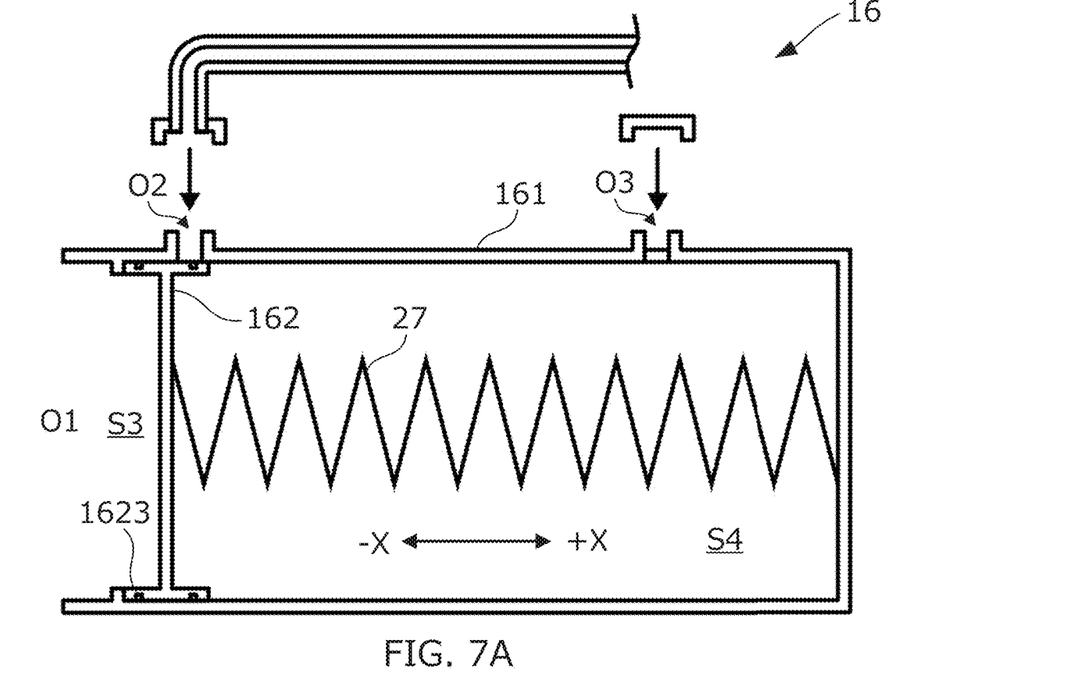
FIGS. 7A and 7B show a configuration of the apparatus for regulating cabin pressure in the cabin according to a modified embodiment of the present invention.
Figure 7B:
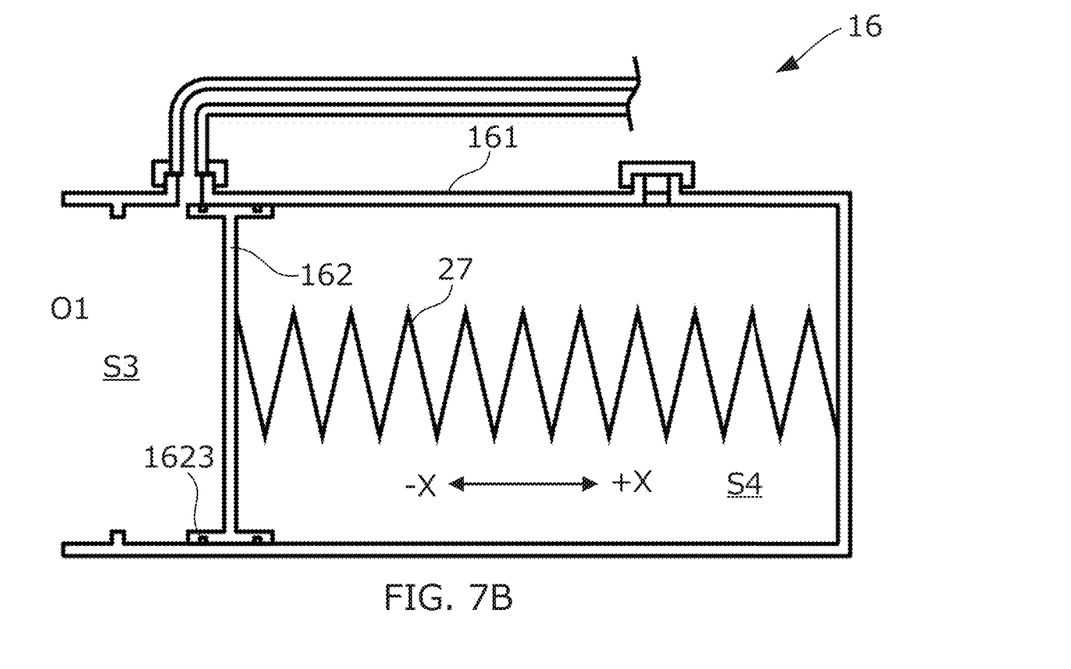

(4) Partition member 162 may be biased in the direction of closure of the gas movement path between internal space S1 and external space S2 when it is in the open state. FIGS. 7A and 7B illustrate the configuration of regulator 16 according to an example of this modification. Regulator 16 according to this modification includes spring 27 (an example of a biasing member) in addition to the components provided in regulator 16 of the above-described embodiment as shown in FIGS. 4A and 4B. It is of note here that while FIGS. 7A and 7B show a single spring 27, the number of springs 27 may be two or more.

The length of spring 27 in a state in which no external force is applied is, for example, longer than the distance between the +X side of partition member 162 in the reference position as shown in FIG. 7A and the −X side of container 161 that faces the +X side of partition member 162. Therefore, spring 27, which is placed in closed space S4 with its longitudinal direction aligned along the X direction, exerts a force on partition member 162 in the −X direction.

Figure 8A:
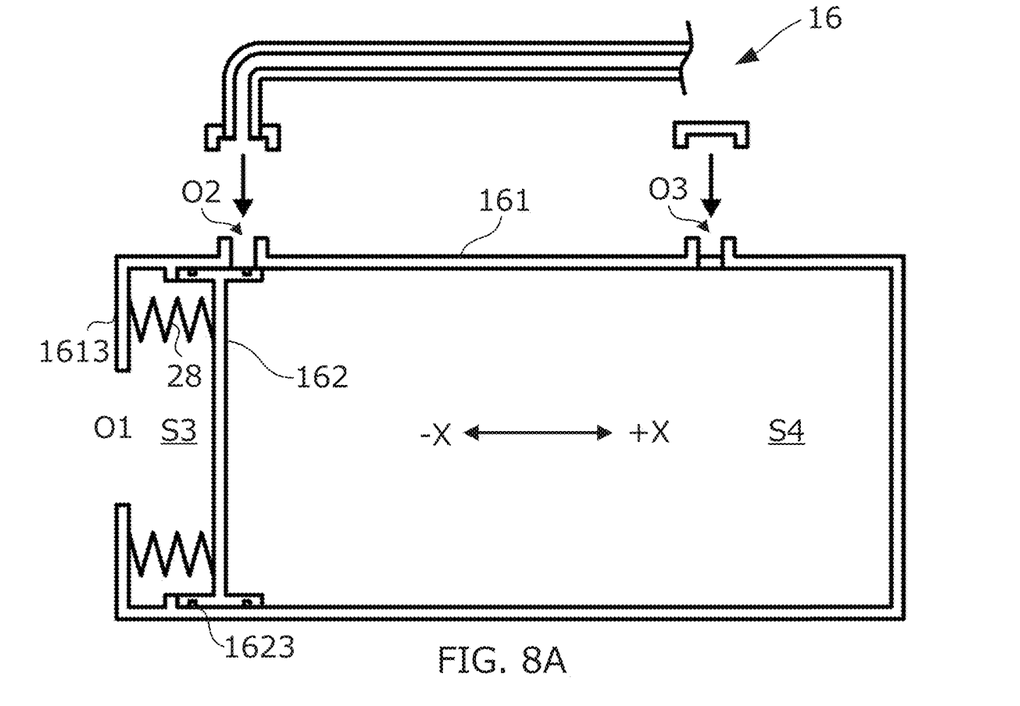
FIGS. 8A and 8B show a configuration of the apparatus for regulating cabin pressure in the cabin according to a modified embodiment of the present invention.
Figure 8B:
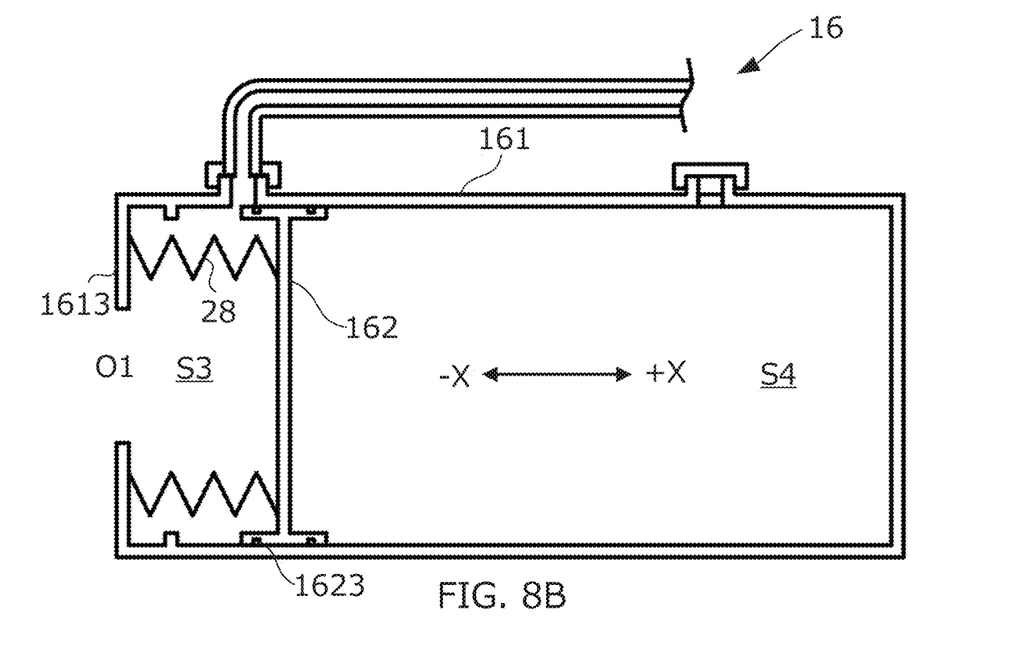

FIGS. 8A and 8B show the configuration of regulator 16 according to another example of this modification. Regulator 16 according to this modification differs from regulator 16 of the above-described embodiment shown in FIGS. 4A and 4B, in that it has flange member 1613, which extends radially inward from the end part of container 161 at the side of opening O1, and it also has springs 28 (an example of a biasing member). It is also of note here that while FIGS. 8A and 8B show two springs 28, the number of springs 28 may be one or three or more.

In a state in which no external force is applied, the length of each of springs 28 is shorter than the distance between the +X side of flange member 1613 and the −X side of partition member 162 facing the +X side of flange member 1613 when partition member 162 is in the reference position as shown in FIG. 8A. Therefore, each of springs 27, which is installed between flange member 1613 and partition member 162 with its longitudinal direction aligned along the X direction, exerts a force on partition member 162 in the −X direction.

It is of note here that while the biasing members of regulator 16 in FIGS. 7A and 7B or FIGS. 8A and 8B are springs, other types of biasing members may also be employed instead of or in addition to the springs. For example, instead of spring 27 or springs 28, an elastic body other than a spring, such as rubber, may be used. Instead of spring 27, a pair of magnets arranged to repel each other in the X direction may also be used. Instead of springs 28, a pair of magnets arranged to attract each other in the X direction may also be used.

Figure 9A:
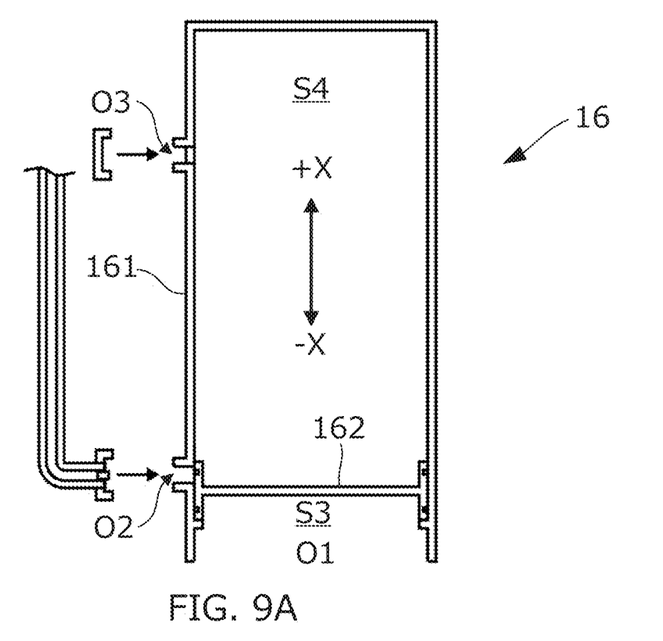
FIGS. 9A and 9B show an arrangement of the apparatus for regulating cabin pressure in the cabin according to a modified embodiment of the present invention.
Figure 9B:
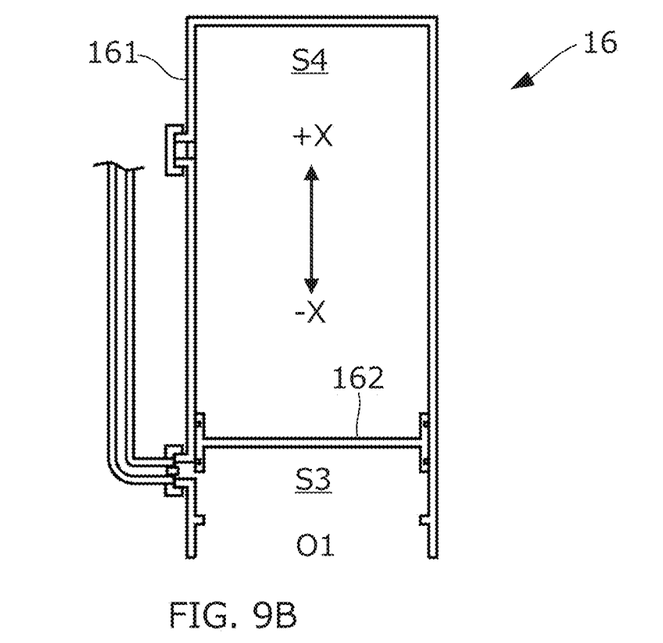

FIGS. 9A and 9B show the arrangement of regulator 16 according to yet another example of this modification. Compared to regulator 16 shown in FIGS. 4A and 4B of the above-described embodiment, regulator 16 of this modification is equipped with common components, but differs in that they are arranged such that the −X direction is in the vertical downward direction. Regulator 16 in FIGS. 9A and 9B does not have a biasing member separated from the other members unlike regulator 16 in FIGS. 7A and 7B or FIGS. 8A and 8B, and partition member 162 is biased in the −X direction by its own weight.

As the gas pressure in internal space S1 increases, causing partition member 162 to move in the +X direction, there may be instances in which it does not move smoothly back in the −X direction when the gas pressure in internal space S1 subsequently decreases. For example friction may act between, for example, O-rings 1623 and the inner surface of container 161. In such a case, an amount of gas flowing from internal space S1 to external space S2 through opening O2 could become excessive, resulting in an excessive reduction in gas pressure in internal space S1. In regulator 16 according to this modification, partition member 162 is biased in the −X direction, which reduces a likelihood of such issues from occurring.

(5) Regulator 16 according to the above-described embodiment constitutes an opening and closing mechanism that controls the gas movement path between internal space S1 and external space S2. This is achieved by partition member 162, which moves due to a difference in pressure between open space S3 and closed space S4, thereby opening and closing opening O2. As long as the movement of partition member 162 opens and closes the gas movement path between internal space S1 and external space S2, various other configurations for the opening and closing mechanism may be employed.

For example, instead of partition member 162 directly opening and closing the gas movement path between internal space S1 and external space S2, a configuration may be employed such that force that acts on partition member 162 due to a difference in internal and external pressure is transmitted through a power transmission mechanism to an opening and closing member. This member then opens and closes the gas movement path between internal space S1 and external space S2.

Figure 10:
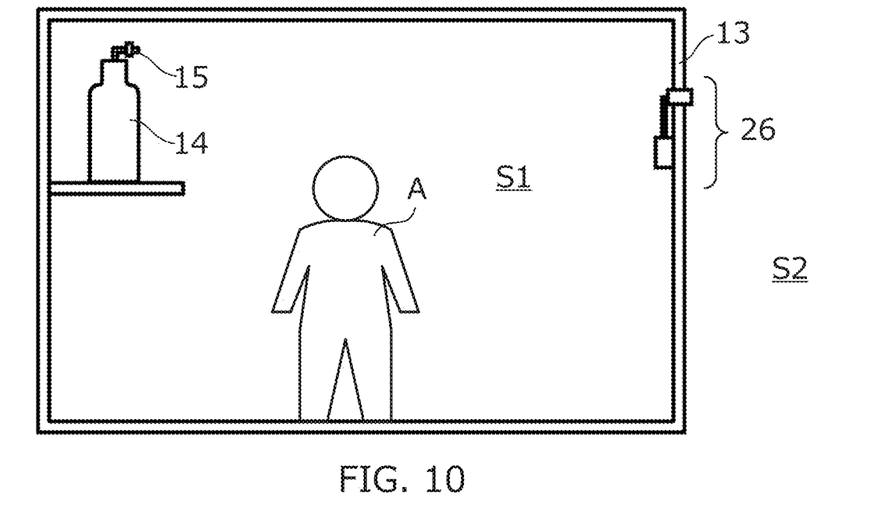
FIG. 10 shows a cabin with an apparatus for regulating cabin pressure according to a modified embodiment of the present invention.
Figure 11:
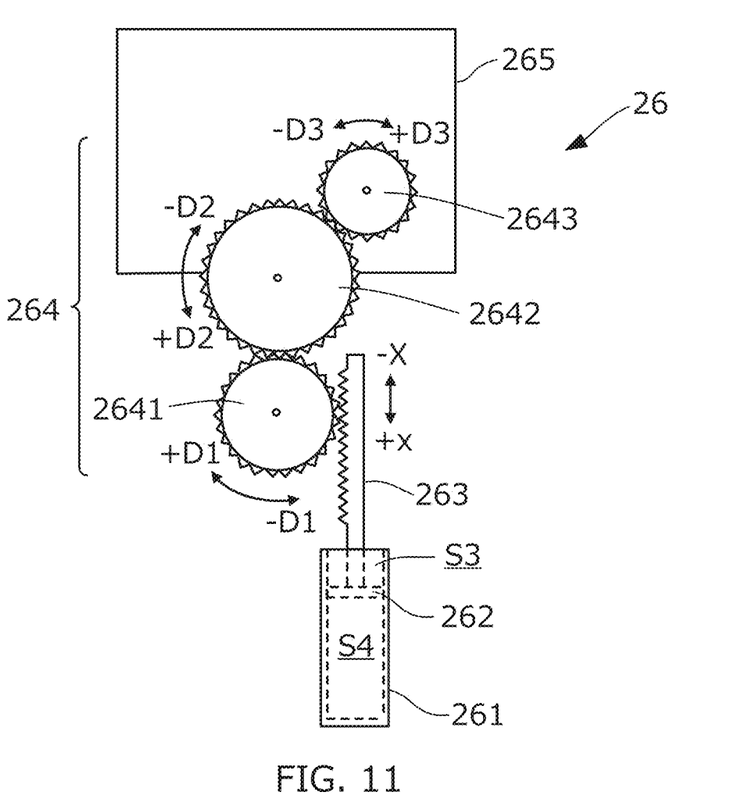
FIG. 11 shows an arrangement of the apparatus for regulating cabin pressure in the cabin according to a modified embodiment of the present invention.

FIG. 10 shows a state in which regulator 26, according to an example of this modification, is attached to Cabin 13. FIG. 11 is a diagram showing a configuration of regulator 26.

Regulator 26 includes container 261 corresponding to container 161 of regulator 16, and partition member 262 corresponding to partition member 162 of regulator 16. Partition member 262 moves in the X direction as shown in FIG. 11 due to a force generated by a difference between an internal and external pressure.

Rack 263 is attached to the −X direction side, i.e. the upper side in FIG. 11, of partition member 262. Partition member 262 and rack 263 may be molded together to be made integral. Rack 263 moves together with partition member 262 in the +X direction when the pressure of the gas in internal space S1 increases, and in the −X direction when the pressure of the gas in internal space S1 decreases.

Regulator 26 includes power transmission mechanism 264. The force generated due to the difference between the internal and external pressure and that acts on partition member 262 is transmitted by power transmission mechanism 264 to open/close valve 265. In the example shown in FIG. 11, power transmission mechanism 264 includes three pinions, i.e. inion 2641, pinion 2642, and pinion 2643, which engage with each other.

In this case, when the pressure of the gas in internal space S1 increases and rack 263 moves in the +X direction, pinion 2641, which engages with rack 263, rotates in the +D1 direction. Pinion 2642, which engages with pinion 2641, rotates in the +D2 direction, and pinion 2643, which engages with pinion 2642, rotates in the +D3 direction.

When the pressure of the gas in internal space S1 decreases and rack 263 moves in the −X direction, pinion 2641, which engages with rack 263, rotates in the −D1 direction. Pinion 2642, which engages with pinion 2641, rotates in the −D2 direction, and pinion 2643, which engages with pinion 2642, rotates in the −D3 direction.

The configuration of power transmission mechanism 264 is not limited to that described above, and various other configurations can be employed. For example, power transmission mechanism 264 may include a greater number of pinions other than three, or may have a configuration that transmits power using a transmission belt.

Regulator 26 includes open/close valve 265 that opens and closes in conjunction with rotation of pinion 2643. Open/close valve 265 (an example of an opening/closing member) is arranged to penetrate the wall of cabin 13 (or to seal a pipe that penetrates the wall of cabin 13). Open/close valve 265 remains closed while the pressure of the gas in internal space S1 remains below the threshold value of pressure PS4(D), and opens when the gas pressure in internal space S1 reaches pressure PS4(D).

(6) In the above-described embodiment, gas containing oxygen is supplied to internal space S1 from gas cylinder 14. Instead of using gas cylinder 14, a storage space for storing gas containing oxygen can be formed in the wall of cabin 13, and the gas containing oxygen can be supplied therefrom to internal space S1.

Figure 12:
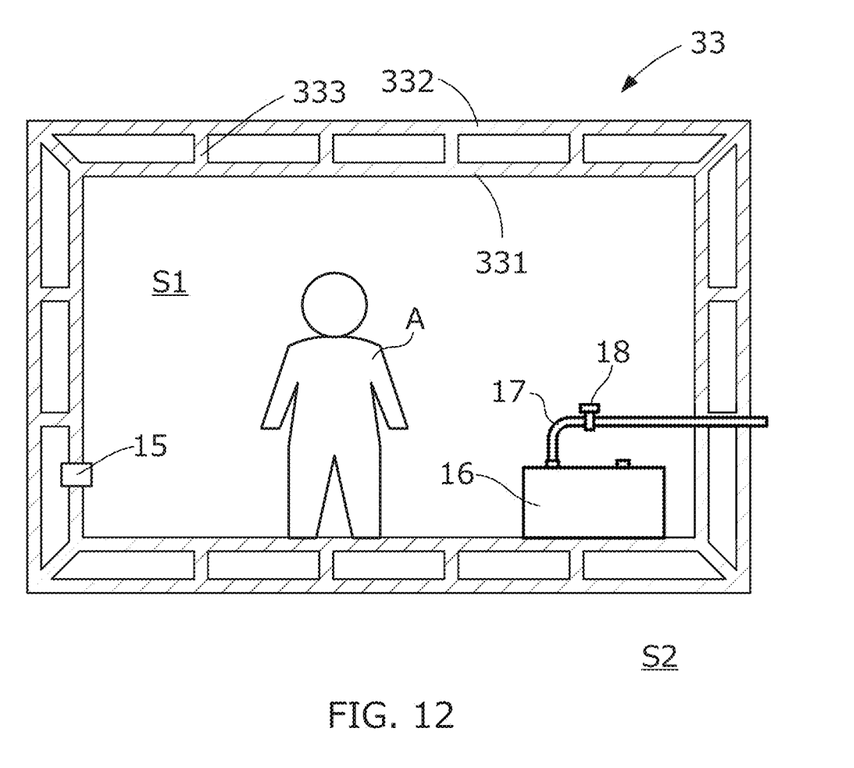
FIG. 12 shows a cabin with an apparatus for regulating cabin pressure according to a modified embodiment of the present invention.

FIG. 12 shows a configuration of cabin 33 according to this modification. Cabin 33 has a double-walled structure, consisting of inner wall 331 and outer wall 332.

Inner wall 331 and outer wall 332 are connected by multiple connecting members 333. Connecting members 333 maintain the positional relationship between inner wall 331 and outer wall 332, and also serve to secure wall-to-wall space S5 between inner wall 331 and outer wall 332.

In FIG. 12, although wall-to-wall space S5 appears to be divided into multiple spaces by connecting members 333, connecting members 333 do not extend in such a way as to segment wall-to-wall space S5, and rather wall-to-wall space S5 forms one continuous space.

Wall-to-wall space S5 is filled with a high-pressure gas containing oxygen. In other words, the double-walled structure comprising inner wall 331, outer wall 332, and connecting members 333 functions as a pressure vessel that accommodates gas containing oxygen at a pressure higher than atmospheric pressure. Via constant flow valve 15, which is arranged to penetrate inner wall 331 (or to seal a pipe that penetrates inner wall 331), gas containing oxygen is supplied from wall-to-wall space S5 to internal space S1. According to this modification, it is not necessary to install a gas cylinder inside the cabin, thus allowing for more efficient use of internal space S1 while reducing a weight of flight craft 1.

(7) The type of flight craft 1 is not limited to a gas balloon. For example, flight craft 1 could be another type of flight craft that rises under buoyancy generated by an envelope, such as a hot air balloon or an airship, or it could be a flight craft that flies using mechanically powered lift, such as an airplane.

(8) The present invention provides an apparatus for regulating cabin pressure exemplified by above-described regulator 16 (or regulator 26). The present invention also provides a system that comprises an apparatus for regulating cabin pressure, a pressure vessel exemplified by gas cylinder 14, and a constant flow valve exemplified by constant flow valve 15, as well as a flight craft equipped with the system.

The invention claimed is:

1. A system comprising:
an apparatus for regulating a gas pressure in an internal space of an airtight cabin that is used to accommodate living beings for transport in a flight craft;
a pressure vessel that stores gas containing oxygen at a pressure higher than atmospheric pressure; and
a constant flow valve that is attached to a first gas transfer path from the pressure vessel to the internal space of the cabin,
wherein
the apparatus includes a container and a moveable partition member that airtightly partitions an internal space of the container into a first space, which is open to the internal space of the cabin, and a second space, which is closed both to the internal space and an external space of the cabin,
the moveable partition member moves in the container under a force generated by a difference between a gas pressure in the first space and a gas pressure in the second space, and
as the moveable partition member moves, it opens and closes a second gas transfer path for flow of gas between the internal space of the cabin and the external space of the cabin.

2. The system according to claim 1, comprising:
a pressure gauge for measuring a pressure of the internal space of the cabin; and
a solenoid valve arranged in a third gas transfer path between the internal space of the cabin and the external space of the cabin, and that opens and closes the third gas transfer path based on a pressure measured by the pressure gauge.

3. The system according to claim 1, comprising:
a differential pressure control valve arranged in a fourth gas transfer path between the internal space of the cabin and the external space of the cabin, and that opens and closes the fourth gas transfer path based on a difference in gas pressure between the internal space of the cabin and the external space of the cabin.

4. The system according to claim 1, comprising:
a carbon dioxide absorber arranged in the internal space of the cabin.

5. The system according to claim 1, wherein
at least a portion of a wall of the cabin comprises an inner wall and an outer wall arranged outside the inner wall,
a space between the at least the portion of the wall that comprises the inner wall and the outer wall is configured as a pressure vessel, and
the pressure vessel contains a gas containing oxygen at a pressure higher than atmospheric pressure.

6. A flight craft comprising:
an airtight cabin that accommodates living beings for transport;
an apparatus for regulating a first gas pressure in an internal space of the cabin; and
a constant flow valve arranged in a gas transfer path from a pressure vessel to the internal space of the cabin,
wherein
the apparatus includes a container, and a moveable partition member that airtightly partitions an internal space of the container into a first space open to the internal space of the cabin, and a second space closed to both the internal space of the cabin and an external space of the cabin,
the moveable partition member moves in the container under a force generated by a difference between a pressure of gas in the first space and a pressure of gas in the second space, and
as the moveable partition member moves, it opens and closes a second gas transfer path between the internal space of the cabin and the external space of the cabin.

* * * * *